UNITED STATES PATENT OFFICE.

WILLIAM S. DEPEW, OF JAMESTOWN, NEW YORK, ASSIGNOR TO MILO HARRIS, OF SAME PLACE.

METAL PAINT.

SPECIFICATION forming part of Letters Patent No. 582,046, dated May 4, 1897.

Application filed January 21, 1897. Serial No. 620,121. (No specimens.)

*To all whom it may concern:*

Be it known that I, WILLIAM S. DEPEW, a citizen of the United States, residing at Jamestown, in the county of Chautauqua and State of New York, have invented certain new and useful Improvements in Metal Paint, as will be fully set forth in this specification.

The object of my invention is to make a metal paint of such a nature that when applied to a cast or mold and vulcanite rubber is applied to it the whole may be vulcanized into one solid body. The paint thus used may serve as a lining for rubber dental plates, or it may be applied to the inside of molds for any hard-rubber article to ornament or strengthen such parts as may be desired.

To make this metal paint, I take flour of aluminium, vulcanite rubber, and chloroform and mix together in such quantities of each as to form a paint that may be applied to a cast or mold, and when vulcanite rubber is laid on the paint the whole may be vulcanized to form a solid body. Instead of the chloroform benzin or any other fluid that will cut the rubber and allow the paint to vulcanize with rubber may be used, but I prefer the chloroform.

In place of aluminium I sometimes use the flour of gold or other non-corrosive metals to make the metal paint.

Instead of the flour of metal any other form of the metal or metals that will mix with the other ingredients to form a mixture that would vulcanize with rubber might be used.

Having fully described my invention, what I claim as new, and desire to secure by Letters Patent, is—

1. A metal paint composed of vulcanite rubber, aluminium and chloroform in such quantities that when the same is mixed and applied to rubber the whole may be vulcanized and form a solid body, substantially as described.

2. A metal paint composed of rubber, aluminium and a fluid or fluids that will cut the rubber and allow the mixture so formed, when applied, to vulcanize with rubber to form a plate or ornament a hard-rubber article, substantially as described.

3. A metal paint composed of rubber, metal and chloroform or other fluid that will cut the rubber, in such quantities of each that when the same is applied with rubber it may be vulcanized to form a solid mass, as described.

In testimony whereof I affix my signature in the presence of two witnesses.

WM. S. DEPEW.

In presence of—
   H. E. BUTLER,
   M. V. DEPEW.